United States Patent

Gratze et al.

[11] Patent Number: 5,052,004
[45] Date of Patent: Sep. 24, 1991

[54] TUNABLE LASERS

[75] Inventors: Stephen C. Gratze, Chelmsford; John M. Bagshaw; Terence F. Willats, both of Great Baddow, all of United Kingdom

[73] Assignee: The General Electric Company p.l.c., London, United Kingdom

[21] Appl. No.: 468,729

[22] Filed: Jan. 23, 1990

[51] Int. Cl.⁵ .............................................. H01S 3/106
[52] U.S. Cl. ......................................... 372/20; 372/28
[58] Field of Search ................... 372/9, 20, 23, 28, 98, 372/108; 350/358

[56] References Cited
U.S. PATENT DOCUMENTS 3,790,898 2/1974 Gudmundsen et al. ............. 372/20
4,028,636 6/1977 Hughes ................................. 372/20
4,586,184 4/1986 Hess ..................................... 372/20
4,736,382 4/1988 O'Meara .............................. 372/20

FOREIGN PATENT DOCUMENTS 1356035 6/1974 United Kingdom .

Primary Examiner—Frank Gonzalez
Assistant Examiner—Susan S. Morse
Attorney, Agent, or Firm—Spencer & Frank

[57] ABSTRACT

A tunable laser having a range of possible emission frequencies has a Bragg cell mounted inside its laser cavity such that only light passing through the Bragg cell without Bragg deflection will be emitted by the laser.

12 Claims, 1 Drawing Sheet

TUNABLE LASERS

BACKGROUND OF THE INVENTION

This invention relates to lasers which are tunable over a range of frequencies.

Lasers which can be tuned to emit light at one of a range of frequencies are useful in many applications, such as optical sensors and communications.

Refering to FIG. 1 such lasers generally comprise a laser cavity 1 containing a laser amplifying element 2 capable of laser amplification over a range of frequencies. The laser cavity 1 is defined by a fully reflective surface 3 and a semi reflective surface 4 through which laser light 5 escapes the cavity 1 and two light absorbing walls 7 and 8. In order to ensure that only laser light at one selected frequency is emitted by the laser a Littrow prism 6 is used.

The Littrow prism 6 can be rotated about an axis perpendicular to the paper. At any angular position of the Littrow prism 6 only one frequency of light will resonate in the laser cavity 1. This is because the refractive index of glass varies with frequency, with light of longer wavelengths being refracted less, so at any position of the Littrow prism 6 only one frequency will strike the reflective surface 3 at 90° and retrace its path through the laser amplifying element 2. Light at all other frequencies will be deflected and eventually strike light absorbing walls 7, 8 of the laser cavity.

There are a number of problems with such a system. The first is that the laser must be tuned from one frequency to another by mechanically moving the Littrow prism, and such tuning will take a very long time compared to the rate at which the laser element can be pulsed or switched on and off. The second is that the mechanisms for mounting and rotating the Littrow prism will be vulnerable to shocks, so vibration or shocks to the laser could de-tune or even destroy it.

Another known way of tuning lasers is shown in FIG. 2. This system comprises a laser cavity 1, laser amplifying element 2, reflective surface 3, semi-reflective surface 4 and light absorbing walls 7 and 8 as before. A Bragg cell 9 is arranged to tune the laser by deflecting light of the required frequency along path 10 so that it strikes the reflective surface 3 at right angles and retraces its path back through the Bragg cell 9 and laser amplifying element 2. Light of all other frequencies 11 passes straight through the Bragg cell and is absorbed by a light absorbent surface 12.

The disadvantage of this construction is that it generally reduces the range of frequencies over which the laser will emit light, and for many types of laser amplifying element makes it impossible for laser light to be generated at all. This is for two reasons. The first is that each time light is deflected by the Bragg cell it undergoes a small frequency change and this frequency change may make laser emission by the system impossible. The second is that each time the light is deflected by the Bragg cell approximately 15 to 20 per cent of it continues straight through on each passage through the Bragg cell and is lost. The extra losses of light intensity due to this may reduce the overall gain of the laser system, that is the laser amplifying element 2, reflective surfaces 3 and 4 and Bragg cell 9, to less than unity and make it impossible for laser emission to occur.

It was the aim of this invention to produce a tunable laser system reducing these problems.

SUMMARY OF THE INVENTION

This invention provides a tunable laser comprising a laser cavity having first and second reflective surfaces and an optical path joining said first and second reflective surfaces such that light can be repeatedly reflected backwards and forwards between said surfaces;

a laser amplifying element disposed within the cavity and situated in said optical path;

means for increasing the population inversion in said laser amplifying element so as to stimulate emission of a beam of light from said laser amplifying element;

an acousto-optic tunable filter comprising a Bragg cell arranged in said optical path;

said Bragg cell being arranged such that in operation only light which passes through said Bragg cell without Bragg deflection is returned to said laser amplifying element.

A laser tuned in this way has the advantage that it is robust and, by altering the acoustic frequencies fed to the Bragg cell, can alter frequency from pulse to pulse of the laser. Because light at the frequency emitted passes through the Bragg cell without interaction, it is not frequency shifted and losses are only those due to reflection at the discontinuities formed by the Bragg cell edges and absorption inside the Bragg cell, so the gain of the system as a whole will be more likely to remain above unity, allowing laser emission to occur.

BRIEF DESCRIPTION OF DRAWINGS

A system embodying the invention will now be described with reference to the accompanying figures, in which.

Similar parts have the same reference numerals throughout.

DESCRIPTION OF THE PREFERRED EMBODIMENT

Figure 1:
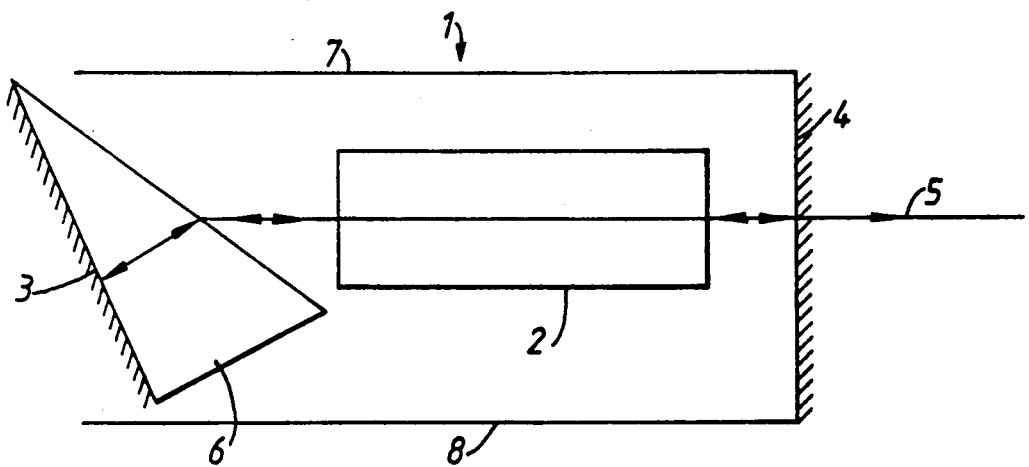
FIG. 1 shows a known tunable laser system employing a Littrow prism in schematic form.
Figure 2:
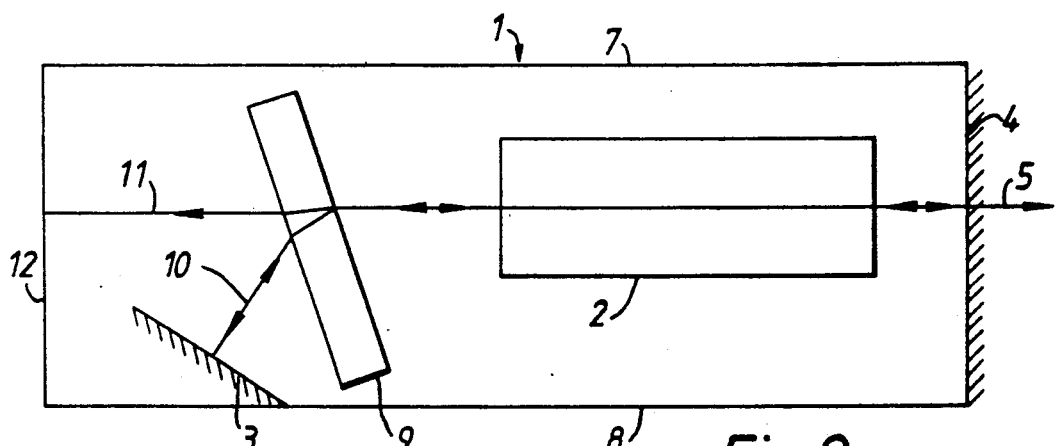
FIG. 2 shows a known tunable laser system employing a Bragg cell in schematic form.
Figure 3:
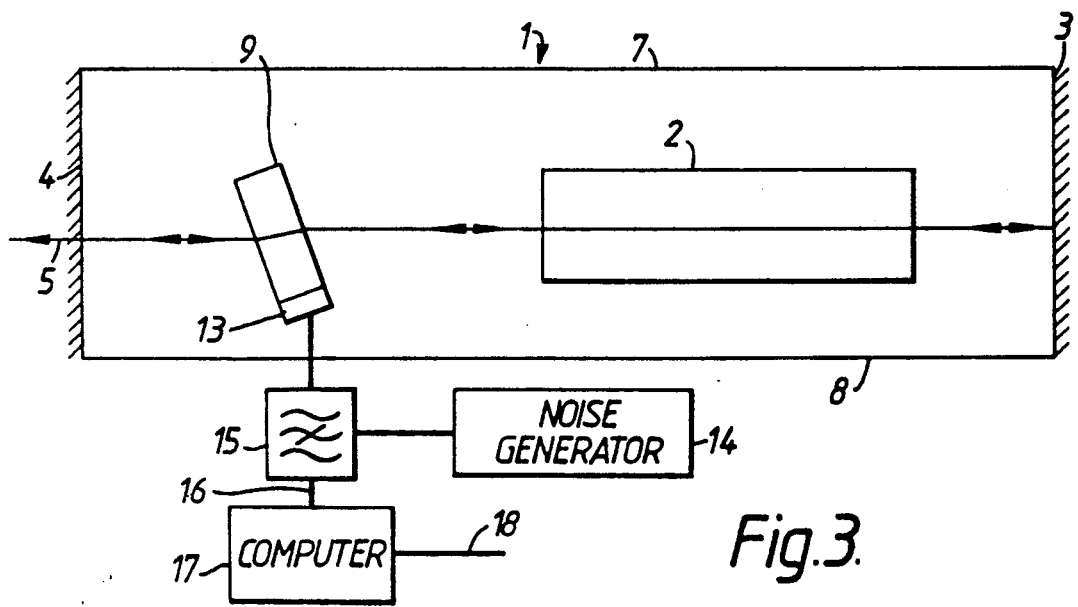
FIG. 3 shows a tunable laser system employing the invention in schematic form.

Referring to FIG. 3, a tunable laser system is contained in a laser cavity 1 defined by a fully reflective surface 3 and a partially reflective surface 4. The laser cavity 1 contains a laser amplifying element 2 and a Bragg cell 9 and has light absorbent side walls 7 and 8. The laser amplifying element 2 is stimulated by a conventional light source, not shown. Such light sources are conventional and are well known to those skilled in the art and will not be described further.

The Bragg cell 9 is arranged so that light from the laser amplifying element 2 passing through it without Bragg deflection will strike the partially reflective surface 4 at right angles, thus allowing repeated reflections between the reflective surface 3 and the partially reflective surface 4 through the laser amplifying element 2 and allowing laser action to produce emission of laser light 5.

Light from the laser amplifying element 2 which does undergo Bragg deflection strikes the walls 7 and 8 either directly or after reflection from the partially reflective surface 4 and is absorbed.

The Bragg cell 9 has acoustic waves projected into it by a piezo-electric crystal 13. The piezo-electric crystal 13 is supplied with an electrical signal from a noise generator 14 via a variable frequency notch filter 15. The frequency of the notch filter 15 is controlled by the voltage on a line 16. This voltage is provided by a computer 17 setting the notch filter 15 to different frequencies in a prearranged sequence.

In operation the noise generator 14 supplies a "white noise" signal to the notch filter 15. The filter 15 removes one frequency from this noise so the piezo-electric element 13 is supplied with a signal having components at all frequencies except for the frequency removed by the notch filter 15. The piezo-electric element 13 then sends acoustic waves into the Bragg cell 9 at all frequencies other than the one removed by the notch filter 15.

In the Bragg cell 9 the acoustic waves interact with the light from the laser amplifying element 2, causing Bragg deflection of all the light except for one frequency, this undeflected light being at the frequency that would be Bragg deflected by acoustic waves at the frequency removed by the notch filter 15.

This undeflected light passes through the Bragg cell 9, and strikes the partially-reflective surface 4 at right angles. This light is then reflected back and forth between the partially reflective surface 4 and the reflective surface 3, passing repeatedly through the laser amplifying element 2 and being emitted through the partially-reflective surface 4.

The emitting frequency of the laser cavity 1 can be altered by changing the frequency removed from the white noise signal by the notch filter 15.

The frequency removed by the notch filter is selected by a computer 17 which is pre-programmed with the sequence and timing of frequency shifts required. The computer 17 can be re-programmed along a line 18 if it needs to be give new instructions.

This system can alter the frequency of laser emission very rapidly, in a pulsed laser system it would be possible to alter the frequency from pulse to pulse.

The white noise generator 14 could be replaced by a series of signal generators each producing a signal having a small range of frequencies, the generators ranges of frequencies being arranged so that they overlap to produce a signal having frequency components at all frequencies that will cause Bragg deflection of one of the laser amplifying elements emission frequencies.

Although the Bragg cell 9 has been described as being separate from the laser amplifying element 2 it would be possible to bond them together or form them monolithically as a single unit.

We claim:

1. A tunable laser for producing light having a selected light frequency, comprising:
    a laser cavity having first and second reflective surfaces and an optical path joining said first and second reflective surfaces such that light can be repeatedly reflected backwards and forwards between said surfaces;
    a multi-frequency laser amplifying element disposed within the cavity and situated in said optical path;
    first means for increasing the population inversion in said laser amplifying element so as to stimulate emission of a beam of light from said laser amplifying element;
    an acousto-optic tunable filter which includes a Bragg cell arranged in said optical path;
    second means for applying to said Bragg cell acoustic frequencies corresponding to light frequencies not selected so that, in operation, only the selected light frequency passes through said Bragg cell without Bragg deflection so as to be returned to said laser amplifying element and all the frequencies not selected are subjected to Bragg deflection and are not returned to the laser amplifying element; and
    third means for varying the acoustic frequencies supplied to said Bragg cell to enable different light frequencies to be selected for return to said laser amplifying element so as to tune the laser.

2. A tunable laser as claimed in claim 1, wherein said laser amplifying element comprises means for amplifying a number of light frequencies, and wherein said second means and third means cooperate with said Bragg cell to select which of these light frequencies is returned to said laser amplifying element in operation.

3. A tunable laser as claimed in claim 1, wherein said acousto-optic tunable filter comprises means for permitting only one frequency of light to pass through said Bragg cell without Bragg deflection.

4. A tunable laser as claimed in claim 1, wherein said second means comprises means for feeding acoustic waves at a number of chosen frequencies into said Bragg cell, said acoustic frequencies being chosen such that light from said laser amplifying element at frequencies other than said selected light frequency undergoes Bragg deflection.

5. A tunable laser comprising a laser cavity having first and second reflective surfaces and an optical path joining said first and second reflective surfaces such that light can be repeatedly reflected backwards and forwards between said surfaces;
    a laser amplifying element disposed within the cavity and situated in said optical path, the laser amplifying element being capable of amplifying a number of light frequencies;
    means for increasing the population inversion in said laser amplifying element so as to stimulate emission of a beam of light from said laser amplifying element;
    an acousto-optic tunable filter which includes a Bragg cell arranged in said optical path to select which of said light frequencies that the laser amplifying element is capable of amplifying is returned to said laser amplifying element in operation, with only light which passes through said Bragg cell without Bragg deflection being returned to said laser amplifying element,
    wherein said Bragg cell is supplied with broadband noise via a notch filter, the frequency of the notch selecting the frequency of light which passes through the said Bragg cell without Bragg deflection.

6. A tunable laser as claimed in claim 1, wherein said Bragg cell and said laser amplifying element are formed monolithically from a single piece of material.

7. A tunable laser, comprising:
    a multi-frequency laser amplifying element;
    a Bragg cell;
    means, having a pair of spaced-apart reflective surfaces, for defining a laser cavity in which the laser amplifying element and the Bragg cell are disposed, the reflective surfaces, laser amplifying element, and Bragg cell being positioned relative to one another so that light is repeatedly reflected between the reflective surfaces along an optical path which passes through the laser amplifying element and the Bragg cell only if the light does not undergo Bragg deflection when passing through the Bragg cell; and selection means, cooperating with the Bragg cell, for selecting the light frequency of the light which does not undergo Bragg deflection when passing through the Bragg cell and for diverting light having other light frequencies from the optical path by Bragg deflection.

8. The turnable laser of claim 7, wherein the selection means comprises means for introducing acoustic waves at a plurality of different acoustic frequencies into the Bragg cell.

9. The turnable laser of claim 8, wherein the means for introducing acoustic waves comprises a noise generator and an electrical filter connected to the noise generator.

10. The turnable laser of claim 9, wherein the electrical filter is a notch filter.

11. The turnable laser of claim 7, wherein the reflective surfaces are parallel to one another.

12. The tunable laser of claim 7, wherein the Bragg cell is disposed between the laser amplifying element and one of the reflective surfaces, and wherein the Bragg cell and said one of the reflective surfaces are positioned relative to one another such that light passing through the Bragg cell toward said one of the reflective surfaces will impinge on said one of the reflective surfaces at a non-perpendicular angle if the light is Bragg deflected.

* * * * *